(No Model.)
R. HUMPHREYS.
TIDE WAVE MOTOR.
No. 259,860. Patented June 20, 1882.
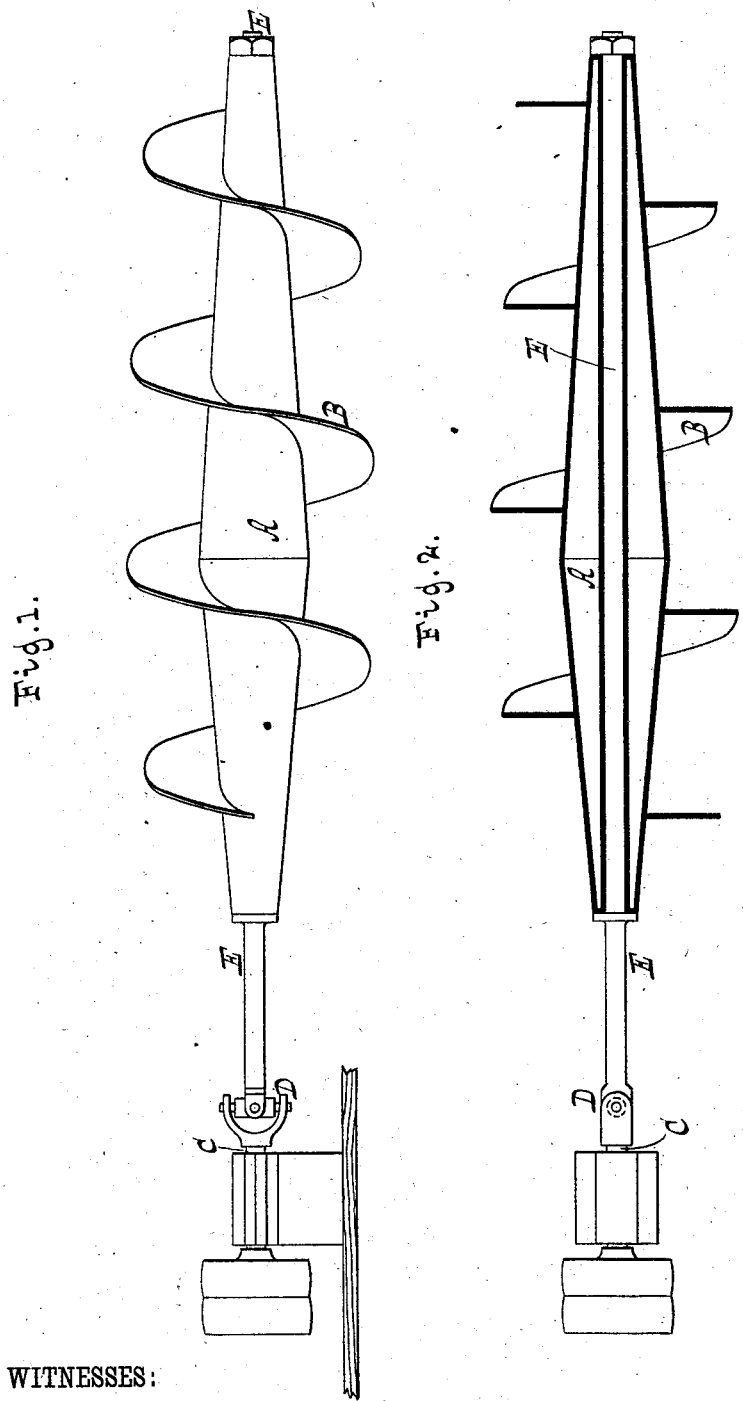
WITNESSES:
Chas. Wahlers.
William Miller.
INVENTOR
Robert Humphreys
BY Van Santvoord & Hauff
his ATTORNEYS.

UNITED STATES PATENT OFFICE.

ROBERT HUMPHREYS, OF NEW YORK, N. Y.

TIDE-WAVE MOTOR.

SPECIFICATION forming part of Letters Patent No. 259,860, dated June 20, 1882.

Application filed April 13, 1882. (No model.)

*To all whom it may concern:*

Be it known that I, ROBERT HUMPHREYS, a subject of the Queen of Great Britain, residing at New York, in the county and State of New York, have invented new and useful Improvements in Tide-Wave Motors, of which the following is a specification.

This invention relates to that class of motors designed to be floated upon the water of a river or stream for utilizing the power to be derived from the tide-wave.

It consists in a screw the body of which is made in form of a float, and which is connected to a driving-shaft at one end by means of a universal joint, so that the screw not only possesses the required buoyancy, but also is capable of adapting itself to variations in the current or flow of the water.

This invention is illustrated in the accompanying drawings, in which Figure 1 represents a side view. Fig. 2 is a longitudinal section.

Similar letters indicate corresponding parts.

The letter A designates the body of the screw, and B the blade thereof; C, the driving-shaft, and D the universal joint, whereby the screw is connected to such shaft.

I make the screw-body A hollow, in order to convert the same into a float; but this purpose can also be accomplished by making the screw-body of wood or other buoyant material. The screw-body A, moreover, embodies in its structure a shaft, E, which is the part connected to the driving-shaft C, such connection being made at one end of the screw, leaving its opposite end free.

The universal joint D may have any usual or suitable construction, and being well known needs no particular description.

In applying the apparatus to use the driving-shaft C is mounted upon a barge or other vessel anchored in the river, or upon a fixed object—as a pile or one of the timbers of a bridge. Said shaft, moreover, is so arranged as to permit the screw to float upon the water, and it follows that the screw-blade is subjected to the action of the current, whereby a revolving motion is imparted to the screw and thence to the driving-shaft, while by the universal joint the screw is permitted to adapt itself to variations in the current due to the position of the barge or other support.

I am aware that a screw has heretofore been mounted in a frame floated by means of scows or boats, and I do not claim such as my invention; but

What I claim as new, and desire to secure by Letters Patent, is—

The combination, substantially as hereinbefore set forth, of the screw having its body composed of a float, the driving-shaft, and the universal joint connecting the screw to the shaft, for the purpose specified.

In testimony whereof I have hereunto set may hand and seal in the presence of two subscribing witnesses.

ROBERT HUMPHREYS. [L. S.]

Witnesses:
W. HAUFF,
CHAS. WAHLERS.